Nov. 12, 1968
D. F. SCHULZ
3,411,081
OHMMETER CIRCUIT INCLUDING INDICATION-LINEARIZING FEEDBACK
Filed Jan. 24, 1966
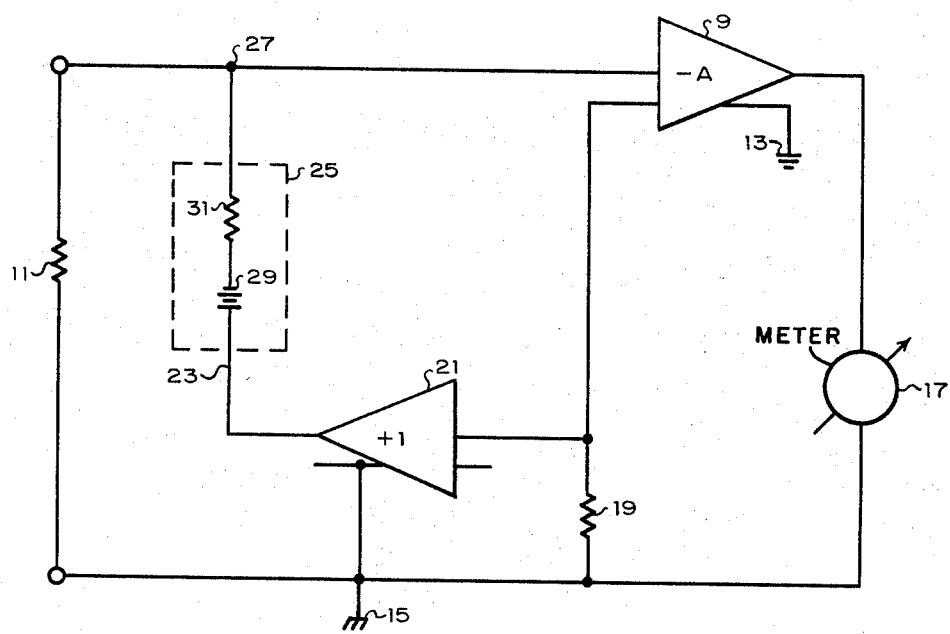
INVENTOR
DONALD F. SCHULZ
BY  Q. C. Smith
ATTORNEY

# United States Patent Office 3,411,081
Patented Nov. 12, 1968

3,411,081
OHMMETER CIRCUIT INCLUDING INDICATION-LINEARIZING FEEDBACK
Donald F. Schulz, Loveland, Colo., assignor to Hewlett-Packard Company, Palo Alto, Calif., a corporation of California
Filed Jan. 24, 1966, Ser. No. 522,689
4 Claims. (Cl. 324—62)

ABSTRACT OF THE DISCLOSURE

In the present ohmmeter circuit an output indication that is linearly proportioned to the impedance to be measured is provided by connecting one terminal of a signal current source to the element to be measured and by maintaining the voltage at the other terminal of the signal current source equal to the voltage drop across the element to be measured.

---

Referring to the drawing which shows a schematic diagram of the ohmmeter circuit of the present invention, a high gain, inverting amplifier 9 is connected to receive the signal across the unknown element 11 with respect to an internal or floating ground reference 13. The output of amplifier 9 is returned through a current-responsive indicating meter 17 to the common ground 15 to which the unknown element 11 is connected. The internal ground 13 and common ground 15 are connected together through resistor 19 such that the return path for output current from amplifier 9 produces a voltage drop across resistor 19 with respect to common ground 15. The low impedance output of unity gain amplifier 21 elevates the potential at one terminal 23 of the current source 25 to the voltage across resistor 19. The current which flows in the other terminal 27 of current source 25 connected to the input of amplifier 9 and to the unknown element 11 causes a voltage drop across the unknown element 11. For high gain in amplifier 9, the voltage across resistor 19 with respect to common ground 15 is substantially equal to the voltage across unknown element 11 with respect to common ground 15. If the voltage across resistor 19 tended to go higher, the increased drop across the unknown element 11 would be amplified by amplifier 9 to cancel the increased drop across resistor 19. Thus, the voltages to common ground across unknown element 11, at terminal 23 and across resistor 19 all remain equal independent of the value of the impedance of the unknown element 11. The current from source 25 is thus equal to the quotient of voltage from source 29 by the resistance of resistor 31, which current flows substantially entirely in unknown element 11 where the input impedance of amplifier 9 is very high compared with the impedance of the unknown element 11. This current in the unknown element 11 is constant for all impedance values and thus the voltage across it is proportional to the impedance of the unknown element. This voltage is amplified and is converted by resistor 19 to a proportional current through meter 17 at the output of amplifier 9. The meter 17 thus provides a linear indication of impedance connected between terminal 27 and common ground 15 over a wide range of values.

I claim:
1. A measurement circuit comprising:
   first and second amplifiers, each having an input and an output and each including a terminal which is common to the input and output;
   a pair of input terminals for receiving an element the impedance of which is to be measured;
   a source of signal current serially connected between the output of the first amplifier and one of said input terminals;
   means connecting the input of the second amplifier to said one input terminal;
   impedance means connecting said terminal of the second amplifier to the other of said input terminals;
   means connecting said input and said terminal of the first amplifier to receive the signal appearing across said impedance means; and
   output means connected between the output of said second amplifier and the other input terminal for providing an indication of the impedance of an element connected between said input terminals.
2. A measurement circuit as in claim 1 wherein:
   said first amplifier has unity gain; and
   said second amplifier has greater-than-unity, phase inverting gain.
3. A measurement circuit as in claim 2 wherein:
   said first and second amplifiers each have very high input impedance and very low output impedance.
4. A measurement circuit as in claim 1 wherein:
   said source of signal current includes serially connected resistor and supply of unidirectional potential.

References Cited

UNITED STATES PATENTS

| 2,925,554 | 2/1960 | Hayes | 324—57 |
| 3,139,579 | 6/1964 | Gravel | 324—57 |
| 3,225,298 | 12/1965 | Cochran | 324—62 |

OTHER REFERENCES

"Apparatus For Measuring Constant or Voltage Variable Capacitances," RCA Technical Notes, No. 647, November 1965.

RUDOLPH V. ROLINEC, Primary Examiner.

EDWARD E. KUBASIEWICZ, Assistant Examiner.